United States Patent
Malkamaki et al.

(10) Patent No.: US 8,169,892 B2
(45) Date of Patent: May 1, 2012

(54) HARQ FAILURE INDICATION OVER IUB-INTERFACE

(75) Inventors: Esa Malkamaki, Espoo (FI); Juho Pirskanen, Tampere (FI)

(73) Assignee: Nokia Corporation, Espoo (FI)

( * ) Notice: Subject to any disclaimer, the term of this patent is extended or adjusted under 35 U.S.C. 154(b) by 532 days.

(21) Appl. No.: 11/795,131

(22) PCT Filed: Jan. 26, 2006

(86) PCT No.: PCT/IB2006/000129
§ 371 (c)(1), (2), (4) Date: Mar. 24, 2008

(87) PCT Pub. No.: WO2006/085174
PCT Pub. Date: Aug. 17, 2006

(65) Prior Publication Data
US 2008/0273454 A1    Nov. 6, 2008

(51) Int. Cl.
*G01R 31/08* (2006.01)
*H04L 12/28* (2006.01)
*H04L 12/40* (2006.01)
*G08C 25/02* (2006.01)

(52) U.S. Cl. ......... 370/216; 370/431; 370/438; 714/748
(58) Field of Classification Search ............... 370/227, 370/228, 438; 714/748
See application file for complete search history.

(56) References Cited

U.S. PATENT DOCUMENTS

| 7,668,192 B2 | 2/2010 | Malkamaki et al. |
| 7,920,888 B2 | 4/2011 | Beming et al. |
| 2002/0069388 A1* | 6/2002 | Niu et al. ................ 714/748 |
| 2004/0052250 A1* | 3/2004 | Hu et al. ................ 370/389 |
| 2004/0196860 A1* | 10/2004 | Gao et al. ............... 370/437 |
| 2005/0030964 A1* | 2/2005 | Tiedemann et al. ..... 370/431 |
| 2007/0049316 A1 | 3/2007 | Beming et al. |
| 2007/0206623 A1* | 9/2007 | Tiedemann et al. ..... 370/431 |

FOREIGN PATENT DOCUMENTS

| WO | WO 2004051872 A2 | 6/2004 |
| WO | 2004091114 | 10/2004 |

OTHER PUBLICATIONS

Korean Office Action issued in parallel Korean Patent Application No. 10-2007-7020323, Mar. 31, 2009 (4 pages).
English language translation of Korean Office Action issued in parallel Korean Patent Application No. 10-2007-7020323, Mar. 31, 2009 (3 pages).
3GPP TSG RAN WG3 Meeting #44 bis; RI-041334; Agenda Item 11.1.3; $3^{rd}$ Generation Partnership Project; Title: Frame fields for the IUB/IUR user-pland for Outer loop power control; Sophia-Antipolis, France; Oct. 4-8, 2004 (2 pages).

(Continued)

*Primary Examiner* — Ricky Ngo
*Assistant Examiner* — Paul Masur

(57) ABSTRACT

The specification and drawings present a new method, system, apparatus and software product for improving the performance of an uplink communication utilizing a hybrid automatic repeat protocol (HARQ) by an HARQ failure indication over Iub-interface (e.g., from a node B to a radio network controller, RNC) in mobile communication networks including a number of HARQ retransmissions before said failure occurred.

22 Claims, 12 Drawing Sheets

OTHER PUBLICATIONS

Ericsson, "HARQ Retransmission and Failure Indication for improved Outer loop power Control", 3GPP TSG RAN WG3 Meeting #45, Shin-Yokohama, Japan Nov. 15-19, 2004, R3-041503. Retrieved from Internet at http://www.3gpp.org/ftp/tsg_ran/WG3_Iu/TSGR3_45/Docs/R3-041503.zip See p. 1, line 14—p. 2, line 4; p. 2, line 16-line 21.

$3^{rd}$ Generation Partnership Project; Technical Specification Group Radio Access Network; UTRAN Iub/Iur interface user plane protocol for DCH data streams (Release 6); 3GPP TS 25.427 V6.4.0 (Sep. 2005); Retrieved from Internet at http://www.3gpp.org/ftp/Specs/archive/25_series/25.4_27/25427-640.zip See p. 17, line 8-line 27.

3GPP TSG-RAN WG3 Meeting #46, Scottsdale, AZ, USA, Feb. 14-18, 2005, Tdoc R3-050366.

3GPP TSG-RAN WG3 Meeting #46 Scottsdale, USA Feb. 14-18, 2005 R3-050212.

3GPP TSG RAN WG3 Meeting #45, Shin-Yokohama, Japan Nov. 15-19, 2004, R3-041503.

3GPP TSG-RAN WG3 #46, Feb. 2005 R3-05-xxxx.

3GPP TR R3.015 V0.2.1 (Dec. 2004) FDD Enhanced Uplink: UTRAN Iub/Iur Protocol Aspects Release 6, Section 6.3.2.

$3^{rd}$ Generation Partnership Project; Technical Specification Group Radio Access Network; UTRAN Iub/Iur interface user plane protocol for DCH data streams,(Release 6), 3GPP TS25.427 V6.1.0 (Dec. 2004) Chapter 6.1.1.

Malaysian Substantive Examination Adverse Report and Search Report mailed Mar. 31, 2010 in corresponding Malaysian Patent Application No. PI 20060418 (4 pages).

Extended European Search Report and Search Opinion dated Jun. 27, 2011 in parallel EP Application No. 06710268.1 (11 pages).

* cited by examiner

| Header CRC | | FT |
| --- | --- | --- |
| CFN | | |
| Num of MAC-es PDUs | | |
| Subframe number | Num of HARQ retrans | spare |
| DDI | | Num of MAC-d PDUs |
| Num of MAC-d PDUs (cont.) | spare | |
| Subframe number | Num of HARQ retrans | spare |
| DDI | | Num of MAC-d PDUs |
| Num of MAC-d PDUs (cont.) | spare | |
| | | |
| Subframe number | Num of HARQ retrans | spare |
| DDI | | Num of MAC-d PDUs |
| Num of MAC-d PDUs (cont.) | spare | |
| spare | MAC-es PDU 1 | |
| MAC-es PDU 1 (cont.) | | |
| Spare | MAC-es PDU n | |
| MAC-es PDU n (cont.) | | |
| spare extension | | |
| Payload CRC | | |
| Payload CRC (cont.) | | |

Figure 2

| Header CRC | | FT |
|---|---|---|
| CFN | | |
| Subframe number | Num of HARQ retrans | F=1 |
| DDI | | Num of MAC-d PDUs |
| Num of MAC-d PDUs (cont.) | spare | F=1 |
| DDI | | Num of MAC-d PDUs |
| Num of MAC-d PDUs (cont.) | spare | F=0 |
| Subframe number | Num of HARQ retrans | F=1 |
| | | |
| Subframe number | Num of HARQ retrans | F=0 |
| DDI | | Num of MAC-d PDUs |
| Num of MAC-d PDUs (cont.) | spare | F=0 |
| Spare | MAC-es PDU 1 | |
| | | |
| MAC-es PDU 1 (cont.) | | |
| | | |
| Spare | MAC-es PDU n | |
| | | |
| MAC-es PDU n (cont.) | | |
| spare extension | | |
| Payload CRC | | |
| Payload CRC (cont.) | | |

Figure 3

| Header CRC | | F T |
|---|---|---|
| Header CRC | spare (FSN) | |
| spare | N of SFN | |
| CF N | | |
| spare | 1st SFN | |
| N of MAC-es PDUs=1 | N of HARQ Retr | |
| DDI=111111 | N=00 | |
| N (cont.)=0000 | Spare | |

| spare | Last SFN |
|---|---|
| N of MAC-es PDUs | N of HARQ Retr |
| 1st DDI | 1st N |
| 1st N (cont.) | 2nd DDI |
| 2nd DDI | 2nd N |

| Last DDI | Last N |
|---|---|
| Last N (cont.) | Pad |
| Spare | MAC-es PDU 1 |
| MAC-es PDU 1 (cont.) | |
| Spare | MAC-es PDU n |
| MAC-es PDU n (cont.) | |
| spare extension | |
| Payload CRC | |
| Payload CRC (cont.) | |

Figure 11a

| Header CRC | | F T |
|---|---|---|
| Header CRC | spare (FSN) | |
| spare | N of SFN=1 | |
| CF N | | |
| spare | 1st SFN | |
| N of MAC-es PDUs=1 | N of HARQ Retr | |
| DDI=111111 | N=00 | |
| N (cont.)=0000 | Spare | |

Figure 11b

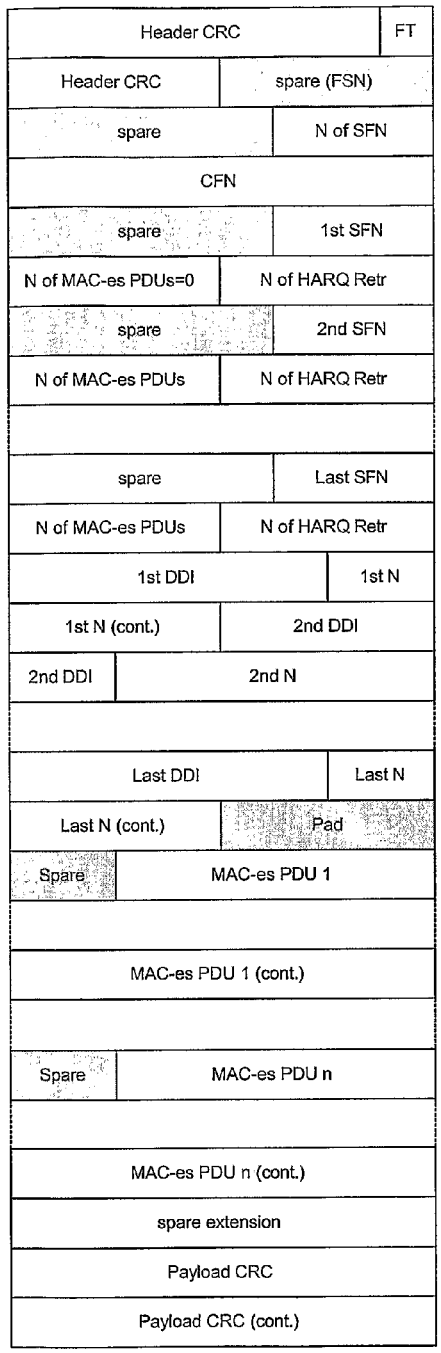
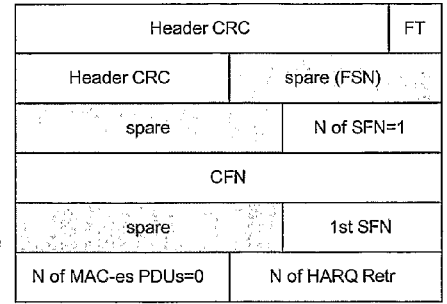
Figure 12b
Figure 12a

HARQ FAILURE INDICATION OVER IUB-INTERFACE

FIELD OF THE INVENTION

This invention generally relates to mobile communication networks and more specifically to a HARQ failure indication over Iub-interface.

BACKGROUND ART

As shown in FIG. 1a, according to 3G WCDMA (Third Generation Wideband Code Division Multiple Access), in communicating via wireless communication, a mobile user equipment (UE) 18 interfaces with a UTRAN (universal mobile telecommunications system (UMTS) terrestrial radio access network) Node B 17 (also sometimes called a base station) over a so-called Uu interface. The UTRAN Node B in turn communicates with a UTRAN radio network controller (RNC) 11 over a so-called Iub interface, and the RNC communicates with a core network (CN) entity, either a mobile switching center (MSC) or a serving GPRS (general packet radio system) support node (SGSN), over a so-called Iu interface, and also communicates with other RNCs over a so-called Iur interface. The Iu interface is more specifically either an Iu circuit-switched interface IuCS between a UTRAN RNC and an MSC, or an Iu packet-switched interface IuPS between a UTRAN RNC and an SGSN.

The 3GPP document E-DCH (enhanced dedicated channel) TR: 3GPP TR R3.015 V0.2.1 (2004-12) FDD Enhanced Uplink: UTRAN Iub/Iur Protocol Aspects (Release 6, Section 6.3.2) adequately describes the problem and opens issues related to the present invention. Section 6.3.2 of the above document is summarized below.

For delay-sensitive conversational class flows, it may be desirable to limit the maximum number of retransmission attempts to only a few. This is particularly true for 10 ms TTI (transmission timing interval), where the payload may lose its relevance to the application in case it is delayed for more than one or two HARQ (hybrid automatic repeat request) retransmissions.

The Node B may detect the failure through the discontinuation of the retransmission events.

At the time of this invention, the following items were of interest:

Details on the way the HARQ Decoding Failure Indication is signalled. For example, this indication could be a specific value of the number of HARQ retransmissions field (e.g. 15) inserted into a UL (uplink) data frame with TB block size set to zero. If the HARQ decoding failure indication is transmitted in the U-plane (user plane), then it shall be timestamped with the CFN (connection frame number) plus subframe number when the last unsuccessful attempt to decode occurred;

Rule for choosing a transport bearer (i.e. a MAC-d flow, wherein MAC stands for medium access control) on which to send the failure indication. This is so because the MAC-d demultiplexing information is contained inband (i.e. within the MAC-e PDU) and is unknown to the Node B prior to successful decoding;

The case where MAC-d flows with different retransmission limits are multiplexed within the same MAC-e PDU (protocol data unit);

Optimisation of the SHO (soft handover) case (e.g. a means for resetting the retransmission counter in a Node B in case a MAC-e PDU was successfully received via another Node B).

DISCLOSURE OF THE INVENTION

According to a first aspect of the invention, a method for an uplink communication utilizing a hybrid automatic repeat request (HARQ) protocol, comprises the steps of: attempting unsuccessfully to decode uplink data by a network element using the HARQ protocol; and selectively reporting to a further network element an indication of a HARQ failure of the attempting, wherein the indication comprises a number of HARQ retransmission attempts performed until the HARQ failure occurs.

According further to the first aspect of the invention, the hybrid automatic repeat request (HARQ) protocol may use N retransmissions until the HARQ failure occurs, N being an integer of at least a value zero which does not exceed a maximum number of allowed retransmissions.

Further according to the first aspect of the invention, the attempting may be interpreted as the HARQ failure by the network element using a predetermined criterion.

Still further according to the first aspect of the invention, the first aspect may further comprise the step of: further reporting a time when the HARQ failure occurred or was detected by the network element.

According further to the first aspect of the invention, the HARQ failure may be reported every time the HARQ failure is detected by the network element.

According still further to the first aspect of the invention, the network element may be a node B of a mobile communication system.

According yet further still to the first aspect of the invention, the reporting of the indication of the HARQ failure may be performed using a frame protocol header.

Yet still further according to the first aspect of the invention, the reporting of the indication of the HARQ failure may be performed using a control frame.

Still yet further according to the first aspect of the invention, the reporting of the indication of the HARQ failure may be performed using a stand alone frame.

Still further still according to the first aspect of the invention, the HARQ failure may be indicated by using a predetermined value for a 1-bit flag.

Further still according to the first aspect of the invention, the HARQ failure may be indicated by using a predetermined value for a number of MAC-es PDUs field. Further, a value of zero may be used for the number of MAC-es PDUs field.

Yet further still according to the first aspect of the invention, the HARQ failure may be indicated by using a predetermined value for a data description indicator (DDI). Further, the data description indicator (DDI) of a binary value 111111 may be used.

According further still to the first aspect of the invention, the reporting of the indication of the HARQ failure may be performed using incorporating the reporting into a data frame containing decoded data. Further, for each the HARQ failure indication in the data frame, a number of subframes field may be incremented by one.

According still further to the first aspect of the invention, the further network element may be a radio network controller (RNC).

According to a second aspect of the invention, a computer program product comprises: a computer readable storage structure embodying computer program code thereon for execution by a computer processor with the computer program code characterized in that it includes instructions for performing the steps of the first aspect of the invention, indicated as being performed by any components of the network element or the further network element.

According to a third aspect of the invention, a network element of a mobile communication system, comprises: a HARQ decoder module, for attempting to decode uplink data using a hybrid automatic repeat request (HARQ) protocol; and a failure reporting generator, for selectively reporting to a further network element an indication of a HARQ failure of the attempting, wherein the indication comprises a number of HARQ retransmission attempts performed until the HARQ failure occurs.

According further to the third aspect of the invention, the hybrid automatic repeat request (HARQ) protocol may use N retransmissions until the HARQ failure occurs, N being an integer of at least a value zero which does not exceed a maximum number of allowed retransmissions.

Further according to the third aspect of the invention, the failure reporting generator may interpret the attempting as the HARQ failure using a predetermined criterion.

Still further according to the third aspect of the invention, the network element may be a node B of the mobile communication system.

According further to the third aspect of the invention, the HARQ decoder module and the failure reporting generator may be combined in one block.

According yet further still to the third aspect of the invention, the HARQ failure may be reported every time the HARQ failure is detected by the network element.

According further still to the third aspect of the invention, the reporting of the indication of the HARQ failure may be performed using a control frame.

Yet still further according to the third aspect of the invention, the reporting of the indication of the HARQ failure may be performed using a stand alone frame.

Still yet further according to the third aspect of the invention, the reporting of the indication of the HARQ failure may be performed using incorporating the reporting into a data frame containing decoded data. Further, for each the HARQ failure indication in the data frame, a number of subframes field may be incremented by one.

Still further still according to the third aspect of the invention, the HARQ failure may be indicated by using a predetermined value for a 1-bit flag.

Further still according to the third aspect of the invention, the HARQ failure may be indicated by using a predetermined value for a number of MAC-es PDUs field. Further, the number of MAC-es PDUs field a value of zero may be used for the number of MAC-es PDUs field.

Yet further still to the third aspect of the invention, the HARQ failure may be indicated by using a predetermined value for a data description indicator (DDI). Further, the data description indicator (DDI) of a binary value 111111 may be used.

According still further to the third aspect of the invention, the reporting of the indication of the HARQ failure may be performed using a frame protocol header.

According to a fourth aspect of the invention, a mobile communication system utilizing a hybrid automatic repeat request (HARQ) protocol for an uplink communication, comprises: a user equipment, for transmitting and re-transmitting an uplink data signal; a network element, responsive to the uplink data signal, for decoding uplink data contained in the uplink data signal using the hybrid automatic repeat request (HARQ) protocol, for providing a HARQ failure indication signal comprising indication of a HARQ failure of the attempting, wherein the indication comprises a number of HARQ transmission attempts performed until the HARQ failure occurs; and a further network element, responsive to the HARQ failure indication signal.

According further to the fourth aspect of the invention, the network element may interpret the attempting as the HARQ failure using a predetermined criterion.

Further according to the fourth aspect of the invention, the HARQ failure may be reported every time the HARQ failure is detected by the network element.

BRIEF DESCRIPTION OF THE DRAWINGS

For a better understanding of the nature and objects of the present invention, reference is made to the following detailed description taken in conjunction with the following drawings, in which:

FIG. 2 is a diagram of an FP (frame protocol) data frame structure where embodiments of the present invention can be implemented;

FIG. 3 is an alternative diagram of an FP (frame protocol) data frame structure where embodiments of the present invention can be implemented;

FIGS. 11a and 11b are diagrams demonstrating E-DCH UL DATA FRAME structure with a HARQ failure indication: FIG. 11a is for the HARQ failure indication piggybacked, and FIG. 11b is for a stand alone HARQ failure indication, according to embodiments of the present invention;

FIGS. 12a and 12b are diagrams demonstrating E-DCH UL DATA FRAME structure with a HARQ failure indication indicated by N of MAC-es PDU=0 for a given SFN: FIG. 12a is for the HARQ failure indication piggybacked, and FIG. 12b is for a stand alone HARQ failure indication, according to the present invention; according to embodiments of the present invention; and FIGS. 13a and 13b are diagrams demonstrating E-DCH UL DATA FRAME structure with a HARQ failure indication indicated by F=1 for a given SFN: FIG. 13a is for the HARQ failure indication piggybacked, and FIG. 13b is for a stand alone HARQ failure indication, according to embodiments of the present invention.

MODES FOR CARRYING OUT THE INVENTION

Figure 1A:
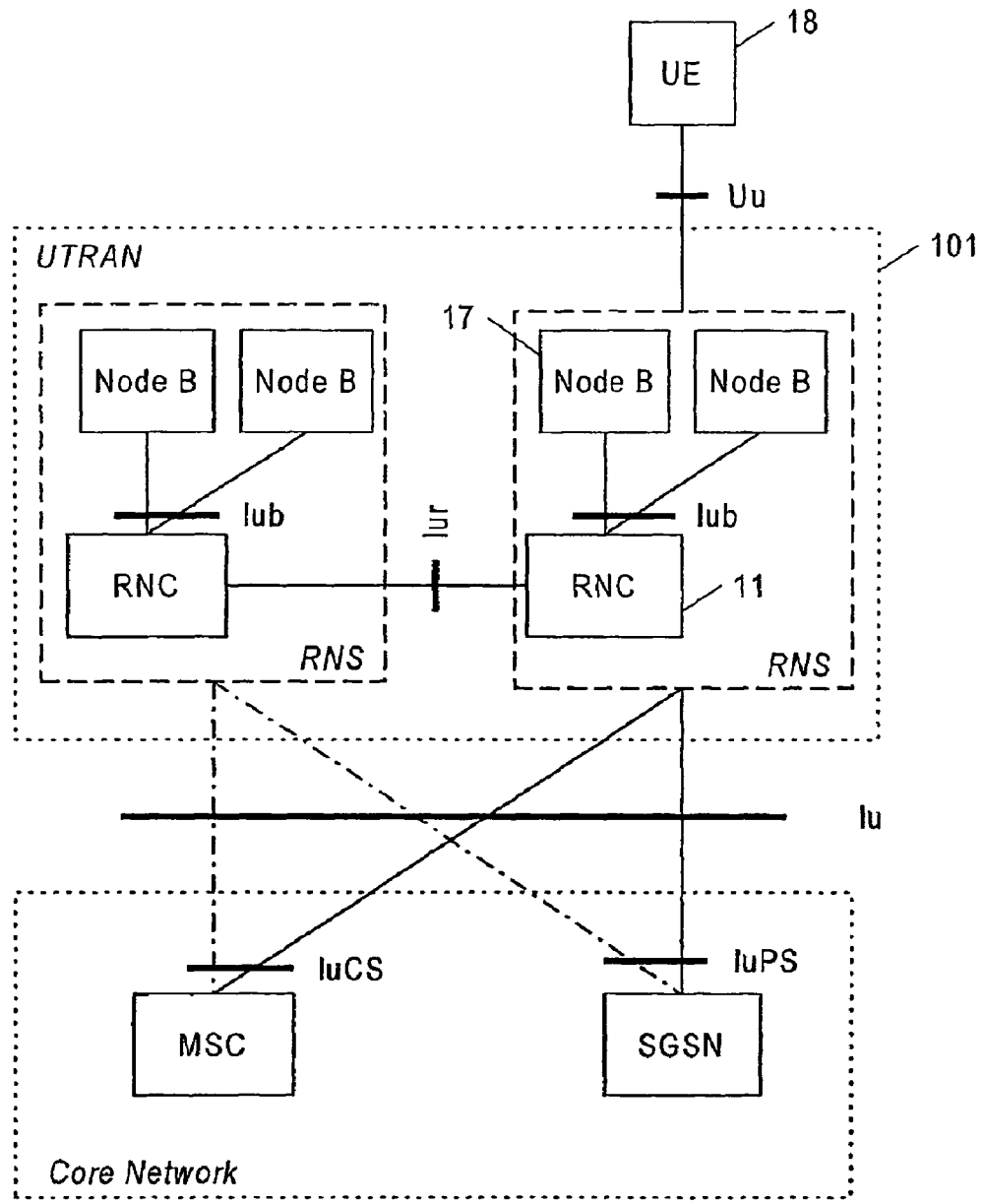
FIG. 1a is a block diagram showing a user equipment (UE) in communication with UTRAN.

A new method, system, apparatus and software product are presented for improving the performance of an uplink communication utilizing a hybrid automatic repeat protocol (HARQ) by a HARQ failure indication over Iub-interface (e.g., from a node B to a radio network controller, RNC) in mobile communication networks including a number of HARQ retransmissions before said failure occurred. The network element (e.g., Node B) can detect the HARQ failure through the discontinuation of the retransmission events using a predetermined criterion. Furthermore, the HARQ failure and said N of the HARQ retransmissions can be transmitted from Node B to, e.g., SRNC (serving RNC) using a frame protocol header. Moreover, the HARQ failure can be reported every time the HARQ failure is detected by the network element or it can be reported selectively using preselected rules.

When operating the HARQ close to the maximum retransmission limit, a change in the radio conditions could result in a situation where the receiver fails to decode the payload within the allowed number of HARQ retransmissions. However, the Outer Loop Power Control (OLPC) situated in the SRNC (serving RNC) will not increase the SIR (signal-to-interference ratio) target, without knowing the decoding failure. Normally, only correctly decoded frames are sent to SRNC. Thus, if the HARQ failure is not reported to the SRNC, there is a risk that subsequent HARQ failures would follow and the SIR target would remain at a too low level. For this reason, there shall be a HARQ Decoding Failure Indication from the Node B to the RNC.

The prior art solution proposes to use a special value (e.g., 1111=15) of the 'Num of HARQ retransmissions' field together with the 'Num of MAC-d PDUs' field set to 0 (or N=0, N is sometimes used instead of the 'number of MAC-d PDUs') inserted into a UL (uplink) data frame (as discussed above) to indicate the failure. This has the drawback that an RNC (radio network controller) does not know how many transmission attempts there were before the failure. This is especially harmful if the failure is due to NAK to ACK feedback error since then the number of attempts may be small (even only one) and RNC should get this information. As part of the HARQ protocol, the Node B sends either ACK (acknowledgement) if the block was decoded correctly or NAK (negative acknowledgement) if the block was not decoded correctly as feedback to the UE. A NAK is a retransmission request. Sometimes a NAK can be interpreted as an ACK in the UE and the block is not retransmitted (NAK to ACK error). This will cause a HARQ failure. Also in SHO (soft handover), where several Node Bs (e.g., Node B1 and Node B2) receive the signal of the UE and each sends either ACK or NAK to the UE, if another Node B (say Node B2) decoded the block correctly and sent ACK, then the UE will naturally not retransmit the block (even if the other Node B1 sent NAK). In this case Node B1 will not receive the block correctly and will indicate the HARQ failure to RNC. (This is not a failure from the RNC point of view since it received the block from Node B2 but the Node B1 does not know that, and therefore cannot distinguish from previous cases). All these cases assume that the Node B received E-DPCCH (enhanced-dedicated physical control channel and tried to decode E-DPDCH and after some retransmissions UE stopped and started new transmission. If E-DPCCH is missed, then the Node B assumes that there was no transmission and, therefore, no failure. Typically, the Node B notices failure after a HARQ round trip time: i.e., the expected retransmission was not sent. This causes delay but reduces Iub traffic. Informing all MAC-e PDU failures increases the Iub traffic and is against the adopted principle that only correct packets are sent over the Iub. (For failed blocks it is not known which MAC-d flow they belong to.) Thus, based on the number of retransmissions, the RNC can in many cases guess whether the failure was due, e.g., to NAK to ACK error, due to max number of transmissions, etc.

According to the present invention, the number of (re) transmission attempts can be communicated to the RNC using the 'Num of HARQ retransmissions' field and indicating the HARQ failure with a binary value DDI=111111 and N=0 (DDI stands for a data description indicator).

Moreover, instead of using the 'Num of HARQ retransmissions' field together with N=0 to indicate the failure, the present invention proposes to use a special value of the DDI field to indicate the failure. This has the advantage that the 'Num of HARQ retransmissions' field can be used for its normal purpose: to tell the number of HARQ retransmissions. Normally it tells how many retransmissions were required to get the transport block through correctly. Now with the present invention it tells the number of HARQ retransmission attempts before the failure. Thus the RNC gets this important additional information also in the case of failure.

Furthermore, according to the present invention, DDI (6 bits) which is sent in the MAC-e header, has 64 different values which are mapped to the logical channel id, MAC-d flow id and the MAC-d PDU size. MAC-e header contains also N, which is the number of MAC-d PDUs within the corresponding MAC-es PDU. It has been proposed that the DDI values as well as the N (equal to the Num of MAC-d PDUs) values are sent to RNC as part of the frame protocol (FP) DATA FRAME header (see FIGS. 2 and 3).

In the air interface, one DDI value (e.g., equal to 111111) is reserved to indicate possible padding at the end of the MAC-e PDU. This value is not sent over the Iub (only the MAC-es PDUs are sent). Thus this DDI=111111 value can be reused to indicate HARQ failure in the FP header. Also some other value can be reserved, but that would mean that that value could not be used to indicate any logical channel in the air interface or Iub.

Figure 1B:
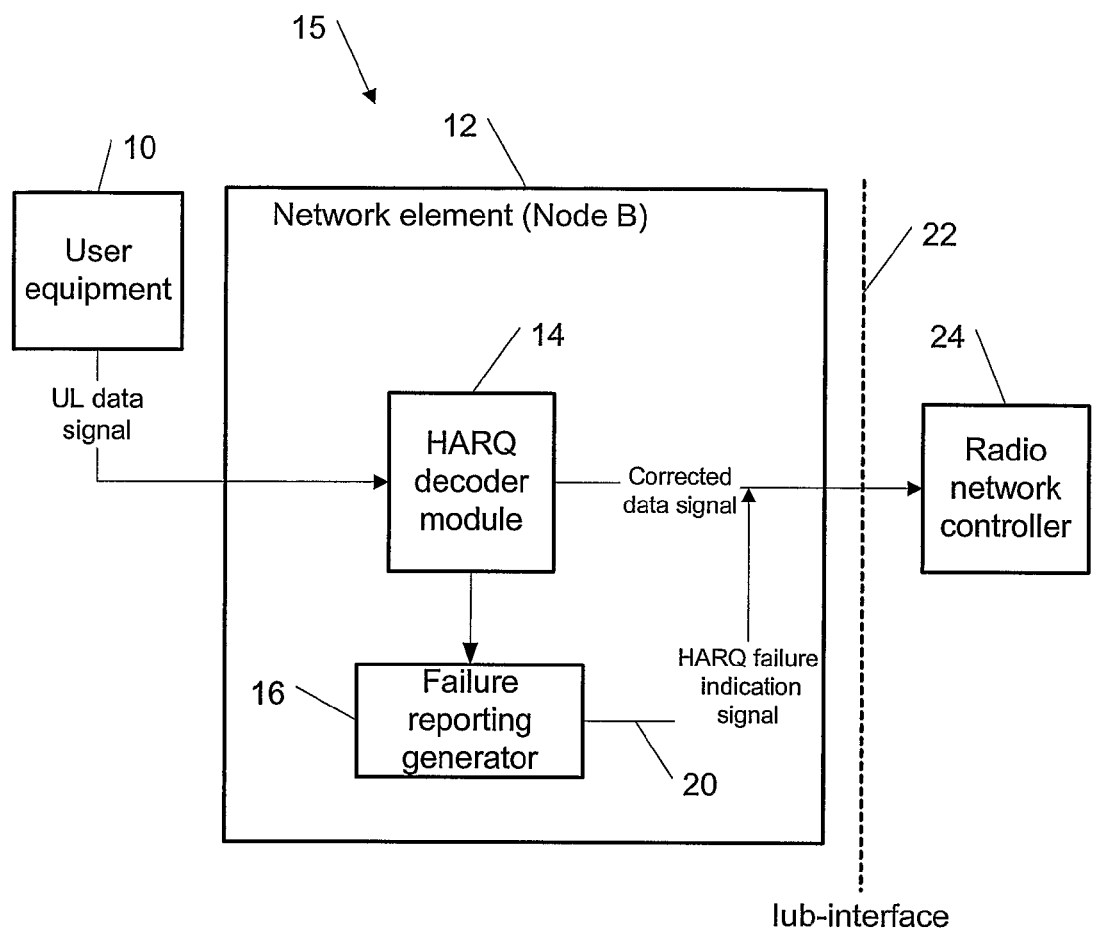
FIG. 1b is a block diagram illustrating a HARQ failure indication over Iub-interface, according to the present invention.

FIG. 1*b* shows one example among others of a block diagram illustrating an HARQ failure indication over Iub-interface in a mobile communication system 15, according to the present invention. A normal uplink (UL) data signal 22 is (re)-transmitted by a user equipment 10 to a HARQ decoder module 14 of the network element (the node B) 12. Based on the reported failures, a failure reporting generator 16 generates an HARQ failure indication signal 20 which can be sent to a radio network controller (RNC) 24 through an Iub interface 22 as a stand alone frame or attached to normal data frame header portion. It is noted that according to the present invention blocks 14 and 16 can be combined.

Two possible FP (frame protocol) DATA FRAME structures are shown in FIGS. 2 and 3. Both structures support bundling of data from multiple air interface TTIs (transmission time interval) into one FP DATA FRAME. In FIG. 3, the header portion related to one MAC-es PDU has been octet aligned, thus giving identical header structure corresponding to each MAC-es PDU (no difference between even and odd PDUs). The payload part has also been optimized knowing that MAC-es PDUs length always is n octets+6 bits (TSN, transmission sequence number). This is due to the fact that RLC (radio link control) PDU length is always multiples of octets and MAC-d for E-DCH does not add C/T field (C/T field indicates the logical channel number). Processing of data inside RNC is simplified when payload octets (bytes) remain the same within FP DATA FRAME, MAC-es, MAC-d as well as RLC and therefore, no shifting of bits is needed. Finally, the header coding follows the general principles for the coding given in Chapter 6.1.1 of 3GPP TS25.427 V6.1.0 (2004-12). (Write and read from left to right and from up to down.)

FIG. 2 (prior art to FIG. 3 only) shows an example among others for the E-DCH (enhanced dedicated channel) FP DATA FRAME which supports bundling of data from several air interface TTIs into one FP date frame. Number of MAC-es PDUs (8 bits) field tells the number of header portions as well as the number of MAC-es PDUs. Subframe number (3 bits) and Number of HARQ retransmissions (4 bits) are repeated for each MAC-es PDU together with the DDI (6 bits) and Number of MAC-d PDUs (6 bits) fields. This same structure can be used even with MAC-es PDUs from a single subframe. The drawback of the approach of FIG. 2 is that the Subframe number and the Num of HARQ retrans fields are repeated for every MAC-es PDUs, even if the MAC-es PDUs were sent in the same subframe.

FIG. 3 shows an alternative frame structure where the Subframe number and Number of HARQ retransmissions fields are given only once per subframe, whereas DDI and Number of MAC-d PDUs fields are repeated for every MAC-es PDU. Number of MAC-es PDUs field has been removed and replaced with two levels of extension flags (F). The flag on the same row as Subframe number indicates whether another subframe follows (F=1) or not (F=0). The other flag at the end of one header portion (after Number of MAC-d PDUs field) indicates whether another header portion of the same subframe follows (F=1) or not (F=0). There is one header portion (DDI plus Num of MAC-d PDUs) for each MAC-es PDU. Also, this structure supports single or multiple air interface TTIs within one data frame. The advantage of this structure is that the Subframe number and the 'Num of HARQ retrans' fields are not repeated unnecessarily, i.e., those MAC-es PDUs sent within one subframe (e.g., 2 ms TTI) have the same subframe and 'Num of HARQ retrans' values. Alternatively, the meaning of the extension flags may be reversed (F=0 to indicate that another subframe or header portion follow and F=1 to indicate that this is the last subframe or header portion, respectively).

In the following it is shown how different embodiments of the present invention can be, e.g., implemented using the frame structures shown in FIGS. 2 and 3. It should be noted that these are just examples and the actual FP DATA FRAME specified by 3GPP may differ from these examples. The HARQ failure indication would also change accordingly (especially those fields that are not part of this invention).

First, a stand alone 'HARQ failure indication frame' i.e., a separate frame that is only used to indicate the HARQ failure is described.

Figure 4:
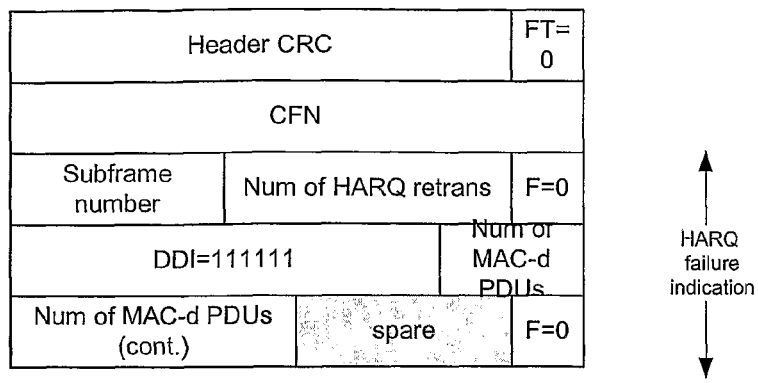
FIG. 4 is a diagram of a stand alone HARQ failure indication frame, according to an embodiment of the present invention.

FIG. 4 is one example among others of a diagram of a stand alone HARQ failure indication frame, according to an embodiment of the present invention following the FP DATA FRAME structure of FIG. 3. If a separate HARQ failure indication frame is created and sent over the Iub, then the frame could look like the one in FIG. 4. DDI field is set to 111111 to indicate the HARQ failure. Num of MAC-d PDUs field is preferably set to 0 to indicate that there is no MAC-es PDU attached. The extension flags (F) are also set to 0 to indicate that no more headers follow (the first flag indicates that no more subframes follow and the second flag indicates that no more header portions (DDI and Num of MAC-d PDU fields) follow). The 'Num of HARQ retrans' field is set to the actual number of retransmission attempts according to this invention. The CFN and Subframe number can tell when the last (re)transmission attempt for this block was received or when the HARQ failure was detected by the network element (e.g., the Node B). The CFN plus subframe is also called the time stamp. Header CRC is calculated over the whole frame (the header in this case), wherein FT=0 (FT stands for a frame type), i.e., indicating a Data Frame.

Figure 5:
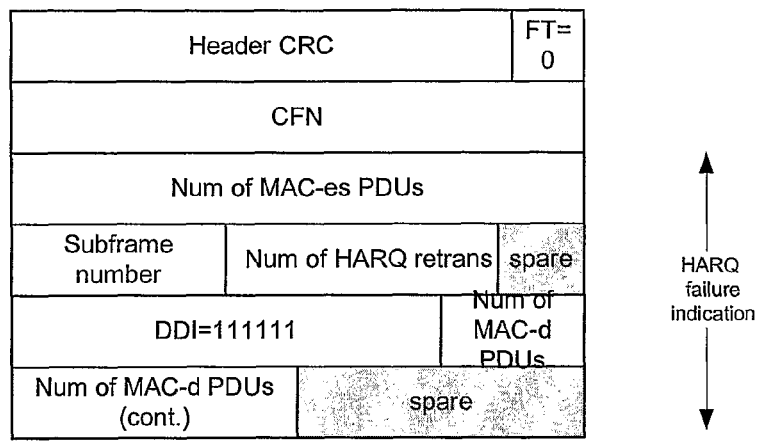
FIG. 5 is an alternative diagram of a stand alone HARQ failure indication frame, according to an embodiment of the present invention.

FIG. 5 is an alternative diagram of a stand alone HARQ failure indication frame, according to another embodiment the present invention. This is according to the other DATA FRAME alternative presented above (see FIG. 2). The only difference is how the number of MAC-es PDUs is indicated: here the extension flags are replaced with a 'Num of MAC-es PDUs' field which tells how many MAC-es PDUs (and corresponding header portions) follow. This field should be set either to 0 to indicate that no MAC-es PDUs follow (but one header portion should be read) or to 1 to indicate that one header portion follows (and DDI=111111 and N=0 indicate that no data follows). Other fields are the same as in FIG. 4.

Figure 6:
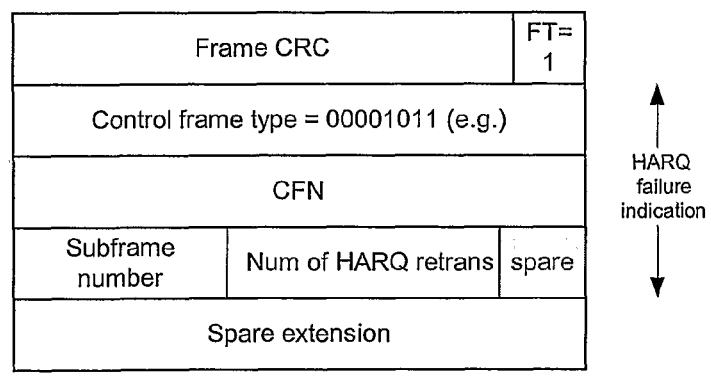
FIG. 6 is a diagram of a HARQ failure indication control frame, according to an embodiment of the present invention.
Figure 7:
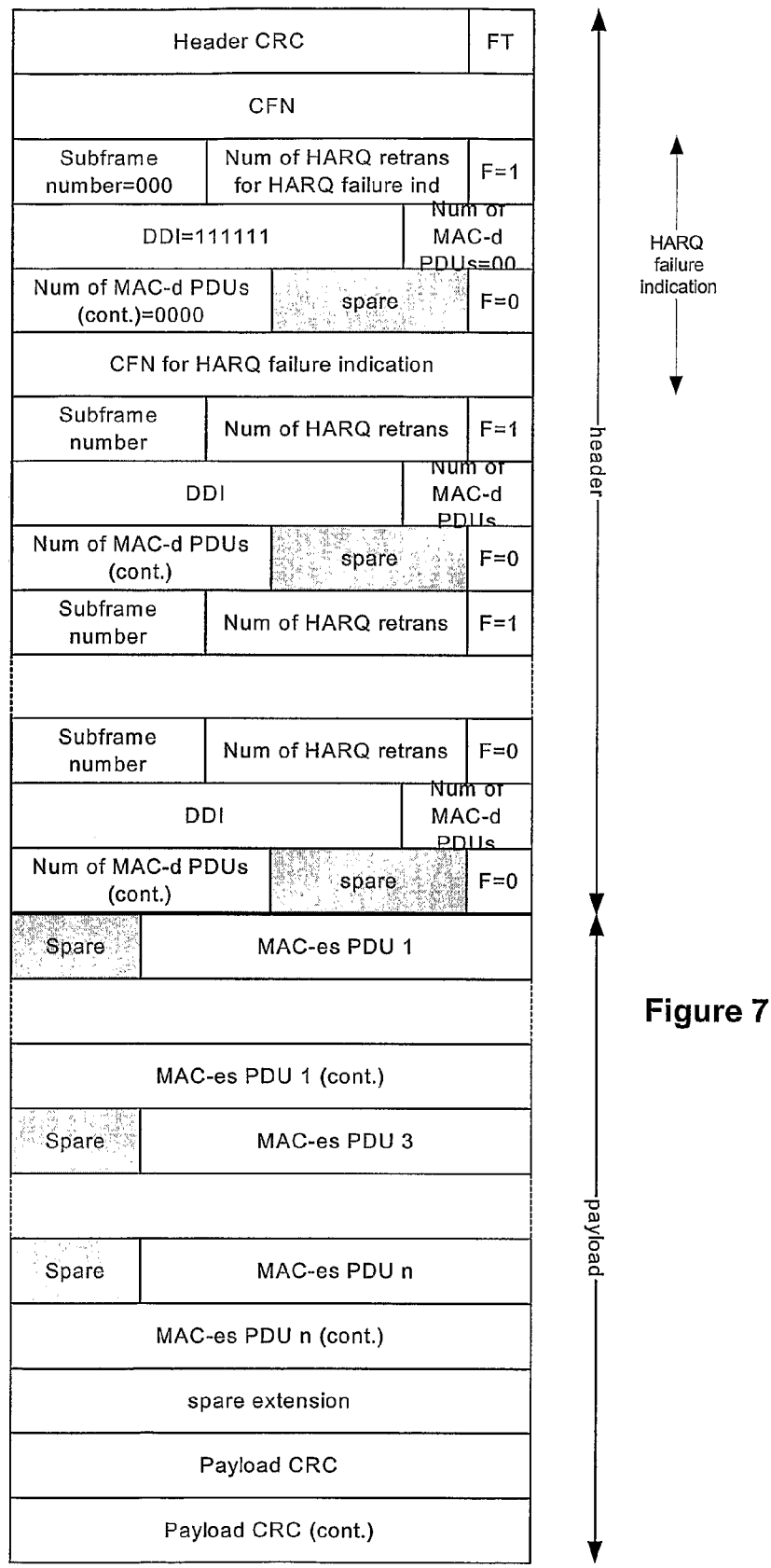
FIGS. 7 through 10 demonstrate different alternatives for combining header portions with HARQ failure indication with normal data header portions, according to an embodiment of the present invention.
Figure 8:
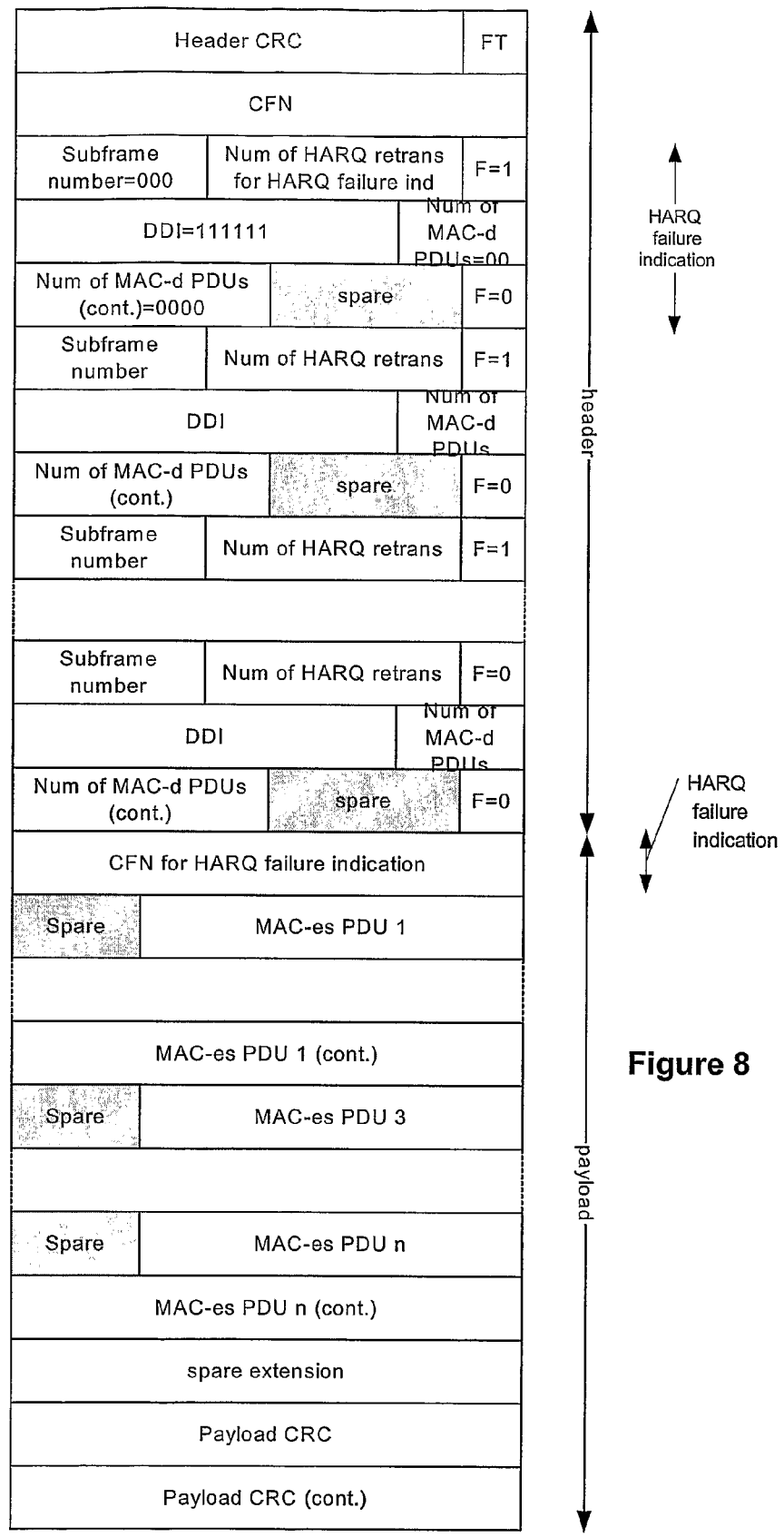

A third alternative for a stand alone HARQ failure indication is to use a control frame as shown in FIG. 6 (FT=1 indicates the control frame). Here, the HARQ failure is indicated by a new control frame type (using the next free code word, e.g., 00001011). Then only the necessary fields: CFN, Subframe number (which is a time stamp) and Num of HARQ retrans are sent (i.e., DDI field and the Num of MAC-d PDUs field are not needed).

According to the present invention, another alternative is to send the HARQ failure indication together with other data if there is correct data to be sent at the same time. In this case, the above presented header portion shown in FIGS. 4 and 5 is sent together with normal data header portions (as shown in FIGS. 7-10). Normally, the DDI field tells the logical channel id and MAC-d PDU size for normal data. The special value of the DDI (preferably 111111) tells that this header portion is HARQ failure indication and that there is no data (no MAC-es PDU) associated with this header portion.

Figure 9:
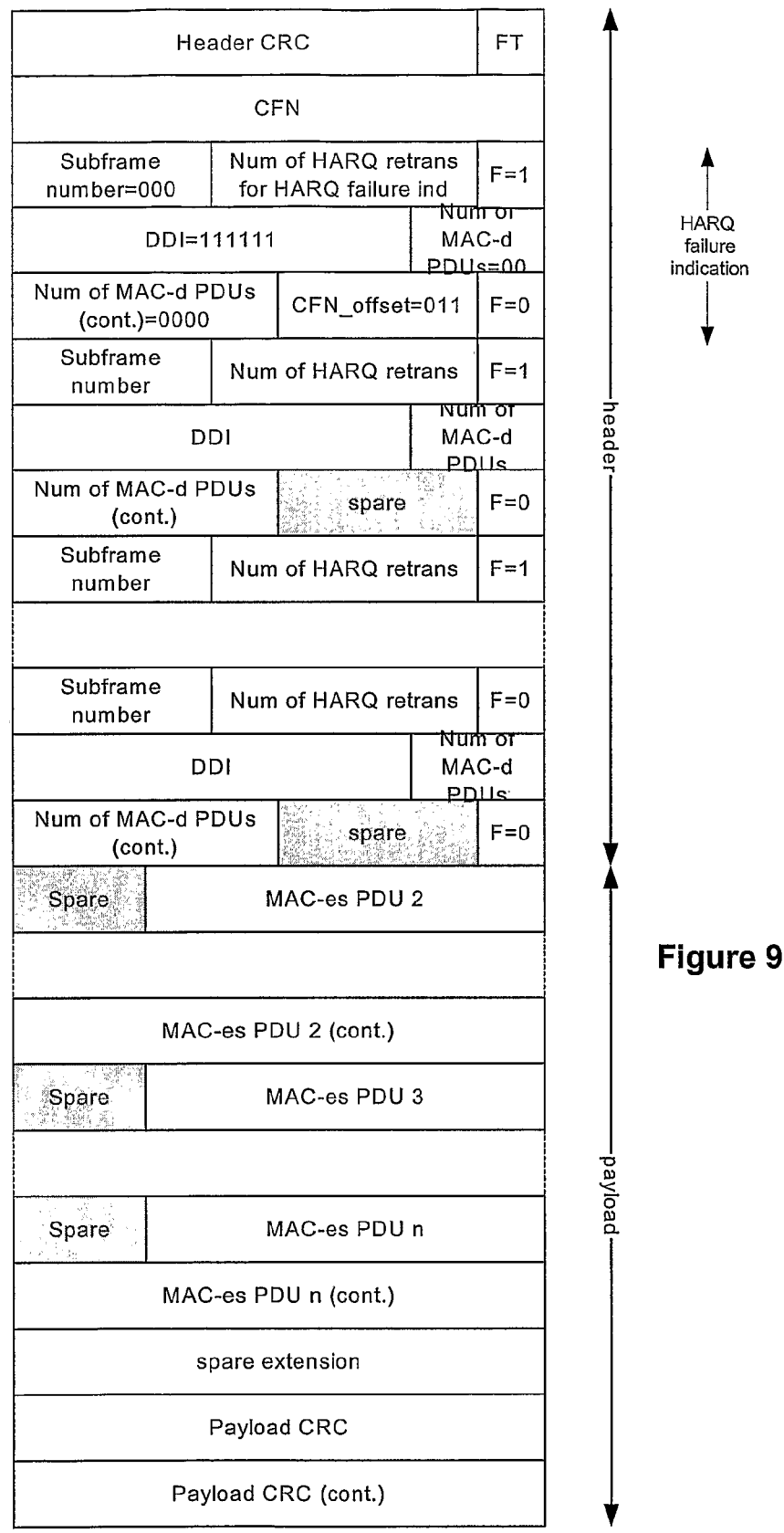

A problem related to this kind of piggybacked HARQ failure indication is that the CFN of the current DATA FRAME may not be the same as the CFN of the failed transmission. This is a typical case if the failure is noticed when the UE started a new transmission instead of the retransmission: then the failure is noticed after the round trip time of the HARQ protocol. To solve this problem, at least two solutions exist: 1) an additional CFN is added to the DATA FRAME (either in the header (FIG. 7) which means variable length header portions or as a one octet payload (FIG. 8)) and then that CFN tells the frame where the failed transmission happened (the failure indication is sent with the corresponding subframe number and Num of HARQ retrans); 2) a negative CFN offset is added to the HARQ failure indication header portion, e.g., by replacing the spare bits after the Num of MAC-d PDUs field with the CFN_offset (FIG. 9). With three bits an offset of 0-7 frames (assuming an unsigned integer presentation) can be indicated which should be more than enough. This CFN_offset is subtracted from the CFN of that DATA FRAME. (Other alternative is to use signed integer but that would require one additional bit.) In all these examples, the HARQ failure indication has its own Subframe number because the 'Num of HARQ retrans' field is needed for the HARQ failure indication according to this invention. The subframe number, the Num of HARQ retrans, DDI and Num of MAC-d PDUs fields as well as flags are on normal positions in the header. Only the CFN of the HARQ failure indication require these special arrangements. The CFN of the HARQ failure indication and the Subframe number form the time stamp of the HARQ failure indication.

Figure 10:
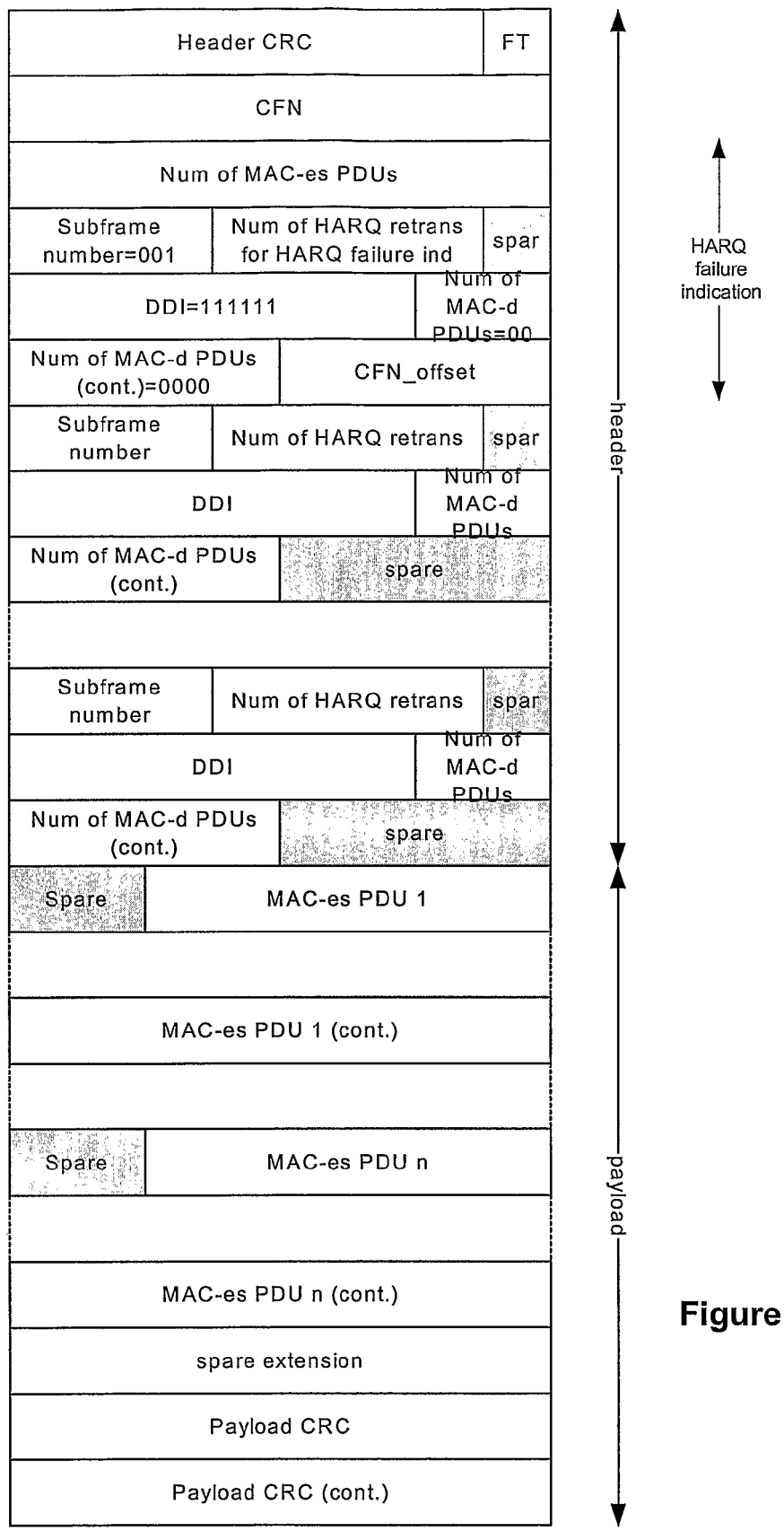

FIG. 10 shows how the HARQ failure indication can be piggybacked with data if the DATA FRAME format of the FIG. 2 is selected.

For the standalone data frame containing only the HARQ failure indication (FIGS. 4 and 5) it may be advantageous to add also the CFN_offset field (if that is selected as the solution) and have it equal to 0 (indicating that the normal CFN is valid). In the similar way if additional CFN is selected as the solution, it may be advantageous to have it also in the stand alone HARQ failure indication frame in order to have same header structure.

Further embodiments of the present invention are further demonstrated in FIGS. 11a, 11b, 12a, 12b, 13a and 13b.

FIGS. 11a and 11b, according to embodiments of the present invention, are diagrams demonstrating E-DCH UL DATA FRAME structure with a HARQ failure indication: FIG. 11a is for the HARQ failure indication piggybacked, and FIG. 11b is for a stand alone HARQ failure indication.

In FIGS. 11a and 11b, parameter settings for the HARQ failure indication are the following:

'N of SFN' is incremented by 1 (i.e., one SFN is used for HARQ failure indication), for instance, '1st SFN' is set to the SFN of the HARQ failure indication (SFN is the sub frame number and 'N of SFN' is the number of subframe numbers, i.e., it tells how many sub frame number (SFN) fields there are in the FP header);

'N of MAC-es PDUs' is set to 1 (to indicate that one set of DDI+N follows);

'N of HARQ Retr' is set to number of HARQ retransmission attempts before failure;

'DDI' is set to 111111; and

'N' is set to 000000 to indicate that there is no payload for this "MAC-es PDU".

If there is no payload part for the HARQ failure indication (e.g., the CFN of the HARQ failure is not sent in the payload as proposed above in the embodiments of the present invention), then 'N of MAC-es PDUs' field can be set to zero thus indicating the HARQ failure. That is, instead of indicating the HARQ failure with DDI=111111, setting 'N of MAC-es PDUs' field to zero (or generally to a predetermined value) or to 15 (the highest value with 4 bits) could indicate the HARQ failure as well, according to an embodiment of the present invention. This has the advantage that up to two octets can be saved in the FP DATA FRAME header: the DDI and N fields could be left out. FIGS. 12a and 12b demonstrate this embodiment of the present invention.

FIGS. 12a and 12b are examples of diagrams among others, demonstrating, according to embodiments of the present invention, E-DCH UL DATA FRAME structure with the HARQ failure indication indicated by N of MAC-es PDU=0 (or generally by the predetermined value) for a given SFN: FIG. 12a is for the HARQ failure indication piggybacked (the light gray part is the failure indication), and FIG. 12b is for the stand alone HARQ failure indication. The HARQ failure is indicated with N of MAC-es PDU=0 for a given SFN, no separate CFN for the HARQ failure indication is present.

In FIGS. 12a and 12b, the parameter settings for the HARQ failure indication can be the following:

'N of SFN' is incremented by 1 (i.e., one SFN is used for the HARQ failure indication);

'1st SFN' is set to the SFN of the HARQ failure indication;

'N of MAC-es PDUs' is set to 0 (this now indicates that this is the HARQ failure indication);

'N of HARQ Retr' is set to a number of HARQ retransmission attempts before failure; and 'DDI' and 'N' are not present.

There is no MAC-es PDU associated with the HARQ failure indication in this case. Also, when the HARQ failure indication is alone (see FIG. 12b), this alternative gives a shorter structure.

Figure 13B:
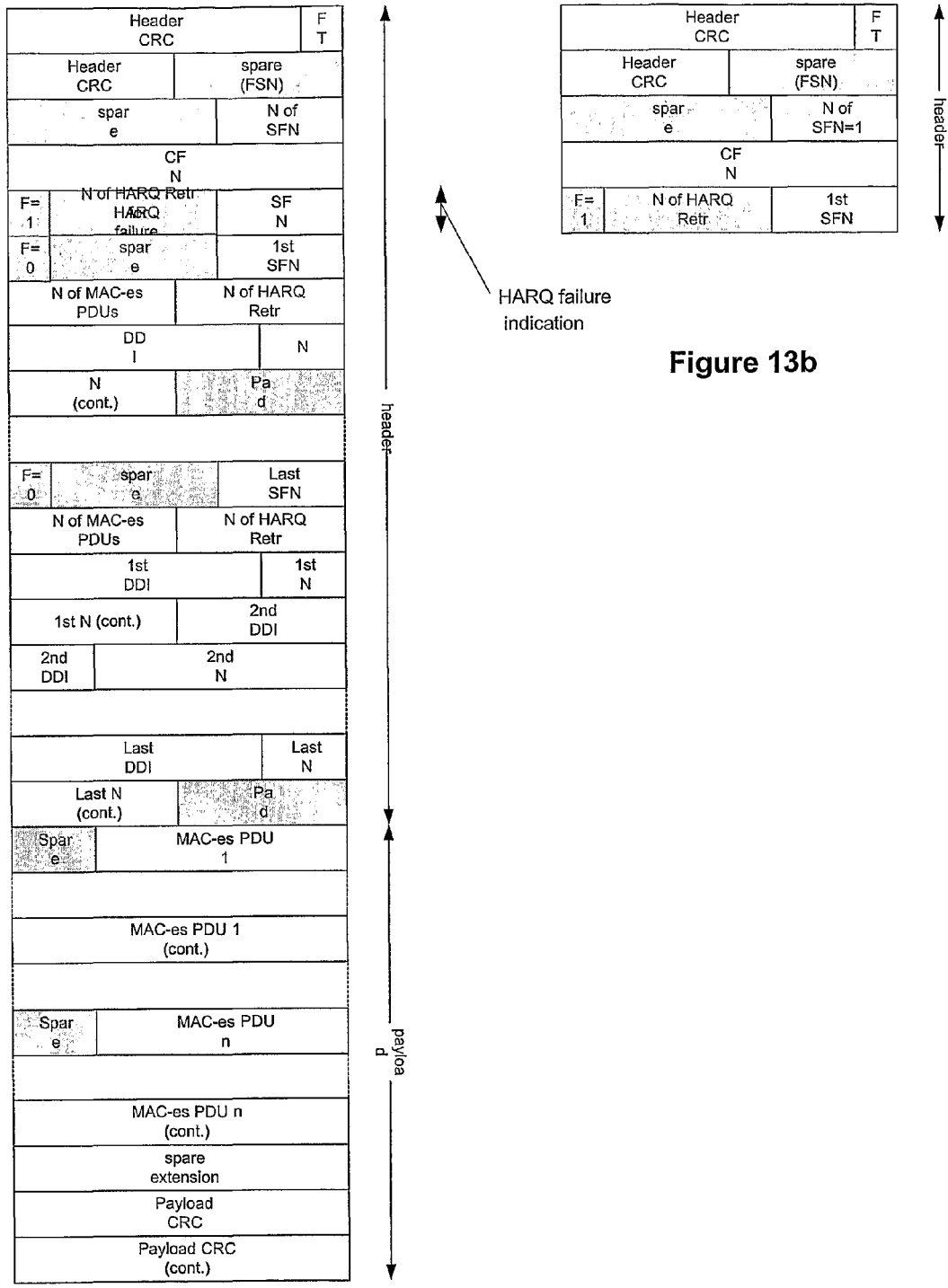

According to further embodiments of the present invention, there is still a possibility to further optimize the structure. The HARQ failure indication should have the following information: N of HARQ Retr, CFN/SFN and some means to indicate that this is the HARQ failure indication (and not a usual header portion). The simplest way of indicating the HARQ failure indication is to use a single bit flag (F). FIGS. 13a and 13b illustrate this concept.

FIGS. 13a and 13b, are examples of diagrams among others, demonstrating, according to embodiments of the present invention, E-DCH UL DATA FRAME structure with the HARQ failure indication indicated by F=1 for a given SFN: FIG. 13a is for the HARQ failure indication piggybacked (the light gray part is the failure indication), and FIG. 13b is for the stand alone HARQ failure indication.

As shown in FIGS. 13 and 13b, a new flag (F) is added to the header. The flag tells whether the part of the header is for the HARQ failure indication (F=1) or for a normal header of the MAC-es PDUs (F=0). When F=1 (the HARQ failure indication) then N of HARQ Retr and SFN fields follow. This means that only one additional octet is needed for the HARQ failure indication. When the flag is set to 0 (F=0), then the normal header portion is followed by SFN, N of MAC-es PDUs, N of HARQ Retr, DDI and N fields.

In FIGS. 13a and 13b, the parameter settings for the HARQ failure indication can be the following:

'N of SFN' is incremented by 1 for each HARQ failure indication (i.e., one SFN is used for each HARQ failure indication);

'SFN' is set to the SFN of the HARQ failure indication;

'N of HARQ Retr' is set to a number of the HARQ retransmission attempts before failure; and 'N of MAC-es PDUs', 'DDI' and 'N' are not present.

There is no MAC-es PDU associated with the HARQ failure indication in this case. Also, when the HARQ failure indication is alone (as shown in FIG. 13b), this alternative gives shorter structure. N of SFNs=1 tells that only one SFN is present and F=1 tells that this is the HARQ failure indication.

There are many possible variations of the scenario demonstrated in FIGS. 13a and 13b. For example, if a separate CFN for the HARQ failure indication is needed, it can be added in the header just after the SFN either as a full CFN or as a CFN offset. Also, it is noticed that it is possible to change the positions of the fields, both for the HARQ failure indication as well as for the normal header portion. For instance, it could be better to have the N of HARQ Retr field always after the F flag in the normal header portion as well. Moreover, naturally the mapping of the F flag can be exchanged: F=0 can be used for indicating the HARQ failure and F=1 then can be used for indicating the normal header portion.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
attempting to decode uplink data by a network element using a hybrid automatic repeat request protocol; and
selectively reporting to a further network element an indication of failure to decode said uplink data, wherein said indication comprises a number of retransmission attempts performed until the failure occurs wherein said failure is indicated by using a value of zero for a number of MAC-es protocol data units field.

2. The method of claim 1, wherein said hybrid automatic repeat request protocol is configured to use a selected number of retransmissions until the failure occurs, said selected number being an integer of zero or more which does not exceed a maximum number of allowed retransmissions.

3. The method of claim 1, wherein said attempting is interpreted as the failure using a predetermined criterion.

4. The method of claim 1, further comprising:
further reporting a time when said failure occurred or was detected.

5. The method of claim 1, wherein said network element is a node B of a mobile communication system.

6. The method of claim 1, wherein said reporting of said indication of the failure is performed using a frame protocol header.

7. The method of claim 1, wherein said reporting of said indication of the failure is performed using a control frame.

8. The method of claim 1, wherein said reporting of said indication of the failure is performed using a stand alone frame.

9. The method of claim 1, wherein said further network element is a radio network controller.

10. A computer program product comprising: a non-transitory computer readable storage structure embodying computer program code thereon for execution by a computer processor with said computer program code, wherein said computer program code comprises instructions for performing the method of claim 1, indicated as being performed by a component or a combination of components of said network element or said further network element.

11. A network element, comprising:
a decoder, configured to attempt to decode uplink data using a hybrid automatic repeat request protocol; and
a failure report generator, configured to selectively report to a further network element an indication of a failure to decode said uplink data, wherein said indication comprises a number of retransmission attempts performed until the failure occurs and wherein said failure is indicated by using a value of zero for a number of MAC-es protocol data units field.

12. The network element of claim 11, wherein said hybrid automatic repeat request protocol is configured to use a selected number of retransmissions until the failure occurs, the selected number being an integer of zero or more which does not exceed a maximum number of allowed retransmissions.

13. The network element of claim 11, wherein said failure reporting generator is configured to interpret said attempt to decode as the failure using a predetermined criterion.

14. The network element of claim 11, wherein said network element is for mobile wireless communications.

15. The network element of claim 11, wherein said decoder and said failure report generator are combined.

16. The network element of claim 11, wherein said failure report generator is configured to report said indication of the failure using a control frame.

17. The network element of claim 11, wherein said failure report generator is configured to report said indication of the failure using a stand alone frame.

18. The network element of claim 11, wherein said failure report generator is configured to report said indication of the failure by incorporating said report into a data frame containing decoded data.

19. The network element of claim 18, wherein for each said failure indication in the data frame, a number of subframes field is incremented by one.

20. The network element of claim 11, wherein said failure reporting generator is configured to report said indication of the failure using a frame protocol header.

21. An Apparatus, comprising:
a processor; and
a computer readable storage structure including computer program code, the computer readable storage structure and the computer program code configured to, with the processor, cause the apparatus at least to:
attempt to decode uplink data using a hybrid automatic repeat request protocol; and
selectively report to a further apparatus an indication of a failure of said attempt, wherein said indication comprises a number of retransmission attempts performed until the failure occurs and wherein said failure is indicated by using a value of zero for a number of MAC-es protocol data units field.

22. The apparatus of claim 21, wherein said computer readable storage structure and said computer program code are configured to, with the processor, cause the apparatus at least to interpret said attempt to decode as the failure using a predetermined criterion.

* * * * *